No. 811,830. PATENTED FEB. 6, 1906.
N. W. CRANDALL.
VALVE FOR DOOR CHECKS.
APPLICATION FILED OCT. 5, 1904.
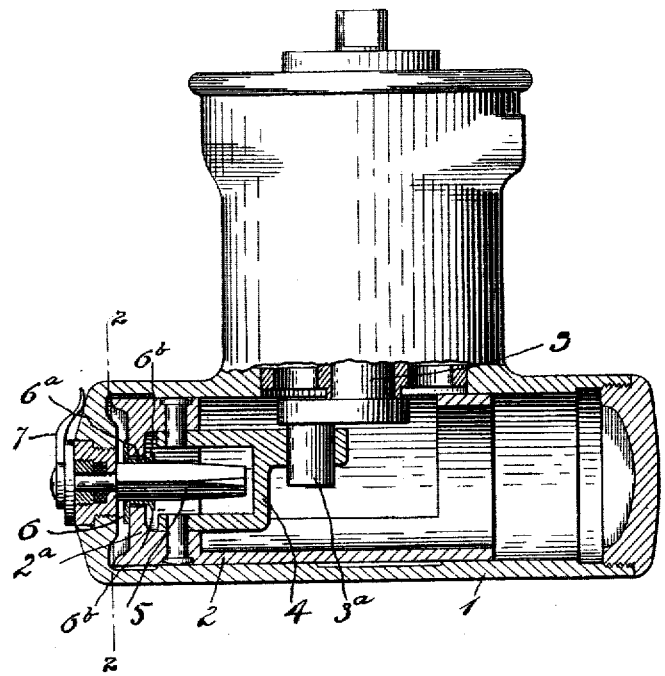
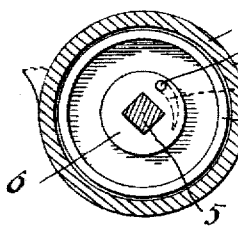
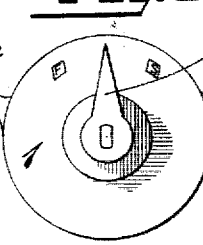
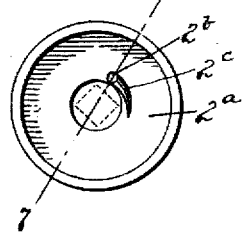
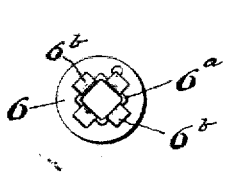
Witnesses
Inventor
Nathan W. Crandall
By his Attorneys

UNITED STATES PATENT OFFICE.

NATHAN W. CRANDALL, OF NEW BRITAIN, CONNECTICUT, ASSIGNOR TO RUSSELL & ERWIN MANUFACTURING COMPANY, OF NEW BRITAIN, CONNECTICUT, A CORPORATION OF CONNECTICUT.

VALVE FOR DOOR-CHECKS.

No. 811,830.　　　Specification of Letters Patent.　　　Patented Feb. 6, 1906.

Application filed October 5, 1904. Serial No. 227,198.

*To all whom it may concern:*

Be it known that I, NATHAN W. CRANDALL, a citizen of the United States, residing at New Britain, in the county of Hartford, State of Connecticut, have invented certain new and useful Improvements in Valves for Door-Checks, of which the following is a full, clear, and exact description.

My invention relates to improvements in liquid door-checks, and has particular reference to the valve mechanism whereby the speed of travel of the piston may be controlled and varied at will.

In the drawings, Figure 1 is a view, partly in vertical section and partly in elevation, of a check provided with my improvement. Fig. 2 is a cross-section of the piston-cylinder on the plane of the line 2 2 of Fig. 1. Fig. 3 is an end elevation of the piston-cylinder. Fig. 4 is a horizontal sectional view of the piston and cylinder. Fig. 5 is an end view of the valve for the piston. Fig. 6 is an end view of the piston detached. Fig. 7 is a section of a portion of the piston, taken on the plane of the line 7 7 of Fig. 6.

The spring mechanism, if any is provided, is immaterial to this invention.

1 is a cylinder.

2 is a piston of any suitable form having the piston-head $2^a$. 3 is a rotatable spindle. $3^a$ is a crank thereon. 4 is a connecting-rod between said piston and said crank.

In the end of the cylinder 1 is supported a plug 5, which is preferably of angular cross-section, as shown, with its inner end tapered. This plug passes through a valve 6 in the form of a plate or washer arranged to bear against the seat at the outside of the piston-head $2^a$ when the piston moves back. This valve 6 has a hub-like portion $6^a$, which passes through the cylinder-head and is preferably of suitable shape to approximately though loosely fit the plug 5 Between the hub $6^a$ of the valve and the side of the opening in the piston-head through which it passes there is sufficient space to allow of the free backflow of liquid contained within the cylinder 1 when the piston moves toward the spindle 3. The inner end or ends of the hub $6^a$ are offset, as at $6^b$, to prevent the entire disengagement of the valve from the piston-head. These offset portions $6^b$ are spaced apart sufficiently from the inside of the piston-head to enable the valve proper to become unseated from the piston-head when the piston advances, thus allowing the said free backflow. To one side of the passage in the piston-head there is a comparatively small port $2^b$. In the valve 6 there is also a comparatively small port $6^c$. These ports $2^b$ and $6^c$ are preferably of substantially the same size, so that when they register the liquid contained between the end of the cylinder and the outer end of the piston-head will flow through the said ports to allow the piston to be moved back, although not without some resistance.

$2^c$ is a groove or channel cut in the outer face of the piston-head 2, the said groove being concentric and gradually increasing in depth from its shallowest end to its deepest end, the latter end communicating with the port $2^b$. (See Fig. 6.)

From the foregoing it will be seen that if the valve 6 is turned so that the port $6^c$ will overstand a portion of the groove $2^c$ the liquid will flow through the ports $2^b$ $6^c$ with less freedom than if the ports $2^b$ and $6^c$ registered. This is true because the groove is of less cross-sectional area than said ports. As the cross-sectional area of the groove decreases it is obvious that by shifting the angular position of the valve relatively to the piston the freedom of flow of liquid through the piston 2 as it moves toward the adjacent end of the cylinder may be increased or diminished at will. This shifting of the valve 6 may be controlled by turning the plug 5, and this may be accomplished by having the handle portion or finger 7 connected to the end of the plug 5 and arranged outside and at the end of the cylinder.

To provide a free closing movement of the door at any particular position, the end portion of the plug 5 may be tapered or cut away at its sides or corners, as shown in the drawings, to permit the free passage of liquid back through the piston-head between the sides of said plug and the surrounding walls or bore of the opposite portion $6^a$ of the valve.

It will be seen that the port $2^b$ is an auxiliary port, as is also the port $6^c$. These ports operate only when the piston is performing its checking function or moving toward the adjacent end of the cylinder under the influence of the spindle rotated by the closing door. It is obvious that these auxiliary ports, as well as the valve and its mountings, may be varied in many ways without departing from the spirit or scope of this invention.

What I claim is—

1. In a liquid door-check, a piston having a passage through its head and an auxiliary passage adjacent thereto, a valve having a hub thereon projecting through said passage in said piston-head and having a port arranged to register with said auxiliary passage through said head and a plug mounted in the check-case and engaging with said valve whereby the angular position of the latter may be varied to increase or diminish the cross-sectional area of the fluid-passage formed by the said auxiliary passage and the port in said valve.

2. In a liquid door-check, a piston provided with a passage through its head and having an auxiliary port therein, an open valve-body loosely seated in said passage and constructed to take a flat seat against the front face of the piston-head and to automatically open when the piston is moved in one direction, and to automatically close when the piston is moved in the opposite direction, said valve-body having a port located to register with the auxiliary port of the piston-head, and means to vary the operative position of the valve for the purpose described.

3. In a liquid door-check, a piston, a valve loosely mounted in the head of said piston and arranged to bear flatwise against an outer seat thereon when the piston is moved in one direction and to become freed from said seat when the piston moves in an opposite direction, an auxiliary liquid-passage through said valve and piston-head, means for adjusting said valve by rotation to increase or diminish the cross-sectional area of said auxiliary passage.

4. In a liquid door-check, a piston, a valve loosely mounted in the head of said piston and arranged to bear flatwise against an outer seat thereon when the piston is moved in one direction and to become freed from said seat when the piston moves in an opposite direction, an auxiliary liquid-passage through said valve and piston-head, means for adjusting said valve to increase or diminish the cross-sectional area of said auxiliary passage, said means comprising a rotatable plug carried by the check-casing and engaging said valve but non-rotatable independently thereof.

5. In a liquid door-check, a piston, a main passage and an auxiliary passage through the piston-head, a valve for both of said passages comprising a plate loosely held by said piston-head and overstanding said auxiliary passage and a rotatable plug loosely fitting said plate and coöperating therewith, and a port in said plate arranged to register with said auxiliary passage.

6. In a liquid door-check, a piston having a main and an auxiliary passage through its head and a concentric groove of gradually-decreasing cross-sectional area extending from said auxiliary port to the surface of the head, a valve for both of said passages comprising a plate loosely held by said head and overstanding said auxiliary passage, a rotatable plug loosely fitting said plate, the latter having a port arranged to register with said auxiliary passage, and means for adjusting said rotatable plug to change the operative position of said valve.

Signed at New Britain, Connecticut, this 28th day of September, 1904.

NATHAN W. CRANDALL.

Witnesses:
M. S. WIARD,
F. E. SUNBURN.